United States Patent
Eckert et al.

(10) Patent No.: US 11,075,838 B2
(45) Date of Patent: Jul. 27, 2021

(54) AUTONOMIC DEVICE FABRIC

(71) Applicant: Futurewei Technologies, Inc., Plano, TX (US)

(72) Inventors: Toerless Eckert, Mountain View, CA (US); Hongliang Gao, Beijing (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 16/055,800

(22) Filed: Aug. 6, 2018

(65) Prior Publication Data
US 2019/0089629 A1 Mar. 21, 2019

Related U.S. Application Data

(60) Provisional application No. 62/560,072, filed on Sep. 18, 2017.

(51) Int. Cl.
| | |
|---|---|
| *H04L 12/28* | (2006.01) |
| *H04L 12/713* | (2013.01) |
| *G06F 8/61* | (2018.01) |
| *H04L 29/08* | (2006.01) |
| *G06F 9/455* | (2018.01) |
| *H04L 12/801* | (2013.01) |
| *H04L 29/06* | (2006.01) |

(52) U.S. Cl.
CPC ............ *H04L 45/586* (2013.01); *G06F 8/61* (2013.01); *G06F 9/45558* (2013.01); *H04L 47/17* (2013.01); *H04L 67/34* (2013.01); *H04L 69/22* (2013.01); *G06F 2009/45579* (2013.01); *G06F 2009/45595* (2013.01)

(58) Field of Classification Search
CPC ........................................................ H04L 12/28
USPC ........................................................... 370/329
See application file for complete search history.

(56) References Cited

U.S. PATENT DOCUMENTS

| 7,506,335 | B1* | 3/2009 | Wooff .................. G06F 8/61 717/173 |
|---|---|---|---|
| 10,243,823 | B1* | 3/2019 | Bharadwaj ........... H04B 10/077 |
| 2014/0201516 | A1 | 7/2014 | Bjarnason et al. |

(Continued)

FOREIGN PATENT DOCUMENTS

| CN | 101150522 A | 3/2008 |
|---|---|---|
| CN | 101536560 A | 9/2009 |
| CN | 102685726 A | 9/2012 |

OTHER PUBLICATIONS

An Autonomic Control Plane (ACP), Behringer et al, Sep. 15, 2017, pp. 1-82.*

(Continued)

*Primary Examiner* — Dang T Ton
(74) *Attorney, Agent, or Firm* — Schwegman Lundberg & Woessner, P.A.

(57) ABSTRACT

A network device is provided that comprises a plurality of physical ports, an autonomic device fabric (ADF) module configured to receive, send, and forward data packets via the plurality of physical ports, a memory that stores instructions, and one or more processors configured by the instructions to perform operations. The operations comprise determining that network device software is not installed and requesting the network device software from a management machine using the ADF module.

20 Claims, 9 Drawing Sheets

(56) References Cited

U.S. PATENT DOCUMENTS

2016/0139938 A1* 5/2016 Dimitrakos ......... G06F 9/44505
                                                      718/100
2018/0098261 A1   4/2018 Wang et al.
2019/0089629 A1*  3/2019 Eckert ................. G06F 9/45558

OTHER PUBLICATIONS

"International Application No. PCT/CN2018/106091, International Search Report and Written Opinion dated Dec. 26, 2018", (dated Dec. 26, 2018), 9 pgs.

* cited by examiner

AUTONOMIC DEVICE FABRIC

PRIORITY CLAIM

This application claims the benefit of priority to U.S. Provisional Patent Application Ser. No. 62/560,072, filed Sep. 18, 2017, and titled "Autonomic Device Fabric," which application is incorporated herein by reference in its entirety.

TECHNICAL FIELD

The present disclosure is related to autonomic networking infrastructure (ANI) and, in one particular embodiment, to an autonomic device fabric (ADF).

BACKGROUND

The Internet Engineering Task Force (IETF) Automated Networking Integrated Model and Approach (ANIMA) working group defines ANI as a management infrastructure that includes secure zero-touch bootstrap using the bootstrapping remote secure key infrastructure (BRSKI), generic signaling using the generic autonomic signaling protocol (GRASP), and secure, autonomously built management connectivity using the autonomic control plane (ACP).

SUMMARY

Various examples are now described to introduce a selection of concepts in a simplified form that are further described below in the Detailed Description. The Summary is not intended to identify key or essential features of the claimed subject matter, nor is it intended to be used to limit the scope of the claimed subject matter.

According to one aspect of the present disclosure, a network device is provided that comprises: a plurality of physical ports; an autonomic device fabric (ADF) module configured to receive, send, and forward data packets via the plurality of physical ports; a memory that stores instructions; and one or more processors configured by the instructions to perform operations comprising: determining that network device software is not installed; and requesting the network device software from a management machine using the ADF module.

Optionally, in any of the preceding aspects, the operations are performed by a hypervisor; and the operations further comprise: receiving the network device software via the ADF module, from a second ADF module of a second network device, the network device software originating from the management machine; and running the network device software in a virtual machine.

Optionally, in any of the preceding aspects, the ADF module configures and locks first entries in a hardware forwarding table comprising hardware forwarding entries; and subsequently, the network device software configures second entries in the hardware forwarding table.

Optionally, in any of the preceding aspects, while the network device software is running, the network device software has exclusive access to programming of the hardware forwarding entries.

Optionally, in any of the preceding aspects, the operations further comprise: receiving a debug command for the network device software via the ADF module; and providing the debug command to the network device software.

Optionally, in any of the preceding aspects, the ADF module performs operations comprising: while receiving the network device software originating from the management machine, forwarding data packets from the management machine to a second network device.

Optionally, in any of the preceding aspects, the request for the network device software is sent by the ADF module of the network device to a second ADF module of a second network device for forwarding to the management machine.

Optionally, in any of the preceding aspects, the network device further comprises second one or more processors distinct from the one or more processors; wherein the ADF module is implemented by the second one or more processors.

Optionally, in any of the preceding aspects, the ADF module is implemented in software run directly by a hypervisor.

Optionally, in any of the preceding aspects, the ADF module forwards a first data packet from a second network device by performing operations comprising: accessing a path from the first data packet; accessing an index from the first data packet; determining, based on the path and the index, an outgoing port for the first data packet; modifying the first data packet by incrementing the index; and sending the modified first data packet on the outgoing port.

Optionally, in any of the preceding aspects, the first data packet comprises an error packet that indicates an error in networking device software of the second network device.

Optionally, in any of the preceding aspects, the ADF module performs operations comprising: receiving a first data packet from a second network device; accessing a path from the first data packet; accessing an index from the first data packet that identifies an indexed port in the path; storing the indexed port as an outgoing port; modifying the first data packet by replacing the indexed port in the path with a port usable by the network device to reach the second network device; and sending the modified first data packet on the outgoing port.

Optionally, in any of the preceding aspects, the ADF module performs operations comprising: receiving a first data packet from a second network device, the first data packet being from a source device and for a destination device; determining, based on the first data packet, that the first data packet is being returned to the source device; accessing a path from the first data packet; accessing a return index from the first data packet that identifies an indexed port in the path; modifying the first data packet by decrementing the return index; and sending the modified first data packet on the indexed port.

According to one aspect of the present disclosure, a method is provided that comprises: determining, by one or more processors, that network device software is not installed on a network device; and requesting the network device software from a management machine using an autonomic device fabric (ADF) module of the network device.

Optionally, in any of the preceding aspects, the method further comprises: receiving the network device software via the ADF module, from a second ADF module of a second network device, the network device software originating from the management machine; and running the network device software in a virtual machine.

Optionally, in any of the preceding aspects, the ADF module configures and locks first entries in a hardware forwarding table comprising hardware forwarding entries; and subsequently, the network device software configures second entries in the hardware forwarding table.

Optionally, in any of the preceding aspects, while the network device software is running, the network device software has exclusive access to programming of the hardware forwarding entries.

According to one aspect of the present disclosure, a non-transitory machine-readable medium is provided that stores instructions that, when executed by one or more processors of a machine, cause the machine to perform operations comprising: determining that network device software is not installed on a network device; and requesting the network device software from a management machine using an autonomic device fabric (ADF) module of the network device.

Optionally, in any of the preceding aspects, the operations further comprise: receiving the network device software via the ADF module, from a second ADF module of a second network device, the network device software originating from the management machine; and running the network device software in a virtual machine.

Optionally, in any of the preceding aspects, the ADF module configures and locks first entries in a hardware forwarding table comprising hardware forwarding entries; and subsequently, the network device software configures second entries in the hardware forwarding table.

Any one of the foregoing examples may be combined with any one or more of the other foregoing examples to create a new embodiment within the scope of the present disclosure.

DETAILED DESCRIPTION

Figure 1:
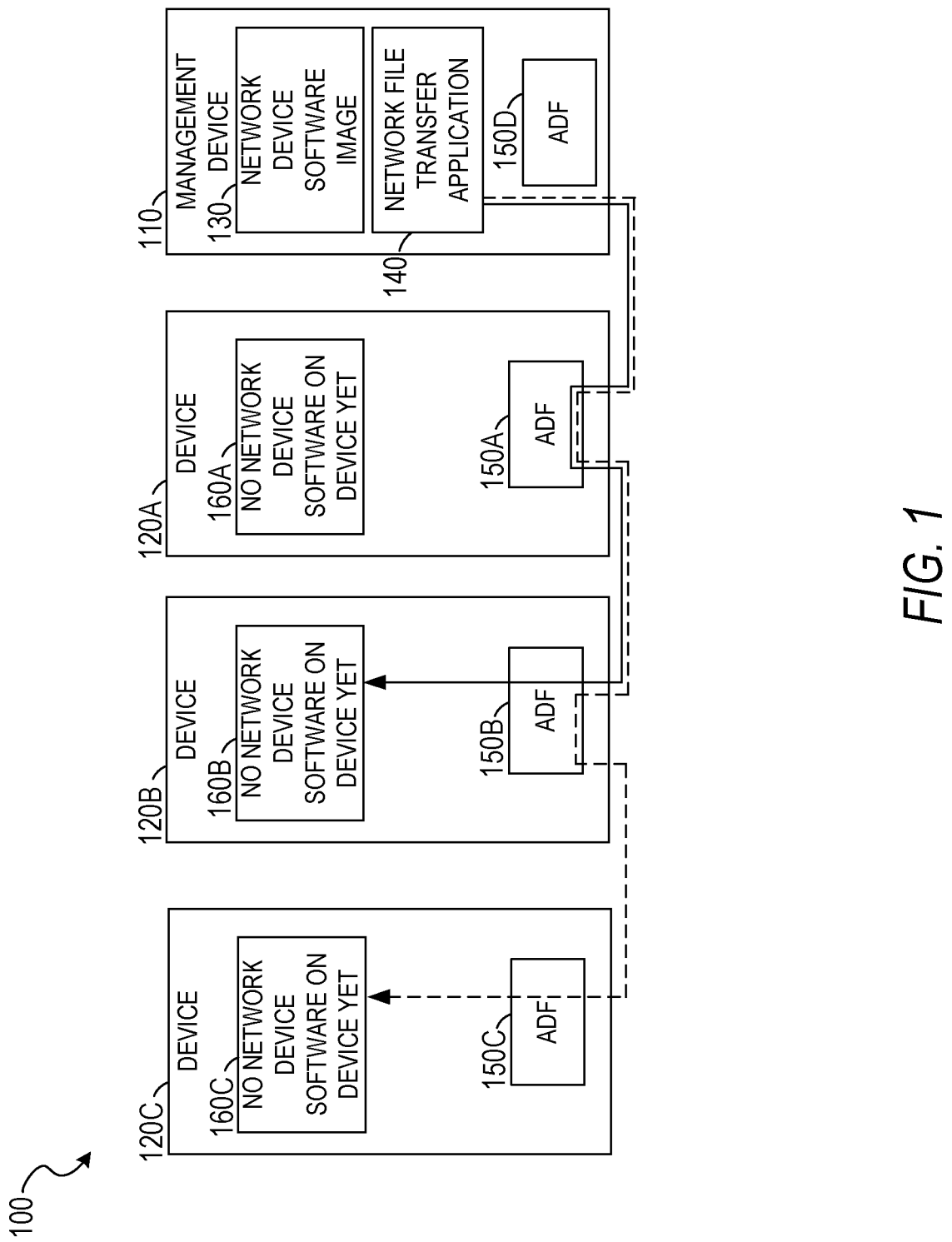
FIG. 1 is an illustration of an example network organization for an ADF, according to some example embodiments.

In the following description, reference is made to the accompanying drawings that form a part hereof, and in which are shown, by way of illustration, specific embodiments which may be practiced. These embodiments are described in sufficient detail to enable those skilled in the art to practice the inventive subject matter, and it is to be understood that other embodiments may be utilized and that structural, logical, and electrical changes may be made without departing from the scope of the present disclosure. The following description of example embodiments is, therefore, not to be taken in a limiting sense, and the scope of the present disclosure is defined by the appended claims.

The functions or algorithms described herein may be implemented in software, in one embodiment. The software may consist of computer-executable instructions stored on computer-readable media or a computer-readable storage device such as one or more non-transitory memories or other types of hardware-based storage devices, either local or networked. The software may be executed on a digital signal processor, application-specific integrated circuit (ASIC), programmable data plane chip, field-programmable gate array (FPGA), microprocessor, or other type of processor operating on a computer system, such as a switch, server, or other computer system, turning such a computer system into a specifically programmed machine.

In some example embodiments, a novel implementation of an ADF is provided. In computing, an autonomic system is a system that works without being controlled by application software. A device fabric refers to a set of devices and their interconnections. Thus, an ADF is a system for interconnecting devices without application-level control. An ADF module of a device is a module implemented in software, firmware, or hardware that controls the device's contribution to the ADF.

In some example embodiments, the ADF is an ANI-like infrastructure that enables unique benefits not possible with arbitrary implementations of an ANI. The ADF implementation places the ANI at the firmware level of the network device (as opposed to inside the network operating system), but also allows for it to leverage hardware forwarding from the network device by sharing the hardware forwarding resources with the network operating system.

ANI supports only BRSKI as a bootstrap mechanism, but ADF provides technical improvements over ANI by allowing the use of other bootstrap protocols, such as Netconf Call Home, BRSKI without a third-party manufacturer authorized signing authority (MASA), or another bootstrap protocol. Bootstrap refers to the process of enabling a device to execute network device software. ANI supports only GRASP as a signaling protocol, but ADF provides technical improvements over ANI by allowing the use of other signaling protocols. ANI supports only the IPv6 routing protocol for low-power and lossy networks (RPL) as a routing protocol, but ADF provides technical improvements over ANI by allowing the use of other routing protocols by the ACP (e.g., open shortest path first (OSPF) or intermediate system to intermediate system (ISIS)). To support secure channels, ANI encrypts all data packets hop-by-hop, but ADF provides technical improvements over ANI by allowing the use of security mechanisms that do not encrypt or authenticate the actual packets (but just authenticate the neighbor). ANI is defined by the IETF Internet-Draft entitled "A Reference Model for Autonomic Networking," ACP is defined by the IETF Internet-Draft entitled "An Autonomic Control Plane (ACP)," BRSKI is defined by the IETF Internet-Draft entitled "Bootstrapping Remote Secure Key Infrastructures (BRSKI)," and GRASP is defined by the IETF Internet-Draft entitled "A Generic Autonomic Signaling Protocol (GRASP)," each of which is a work in progress.

As used herein, the term "network device" refers to typical standalone network devices such as routers or L2 switches interconnected by (e.g., Ethernet) network connections as well as a physical chassis of a multi-chassis device such as a large router connected by "fabric" connections in the multi-chassis device. The latter instance is where the name "Device Fabric" originates from, but the inventive subject matter is not limited to that instance.

FIG. 1 is an illustration of an example network organization 100 for an ADF, according to some example embodiments. FIG. 1 includes a management device 110 and managed devices 120A, 120B, and 120C. In FIG. 1, the devices 120A-120C are devices physically connected to form a connected network. Each of the devices 120A-120C has a corresponding storage region 160A, 160B, and 160C, respectively. As shown in FIG. 1, each of the storage regions 160A-160C does not yet store network device software. The management device 110 stores a network device software image 130 and executes a network file transfer application 140. The devices 120A-120C do not have network device software loaded, but only ADF modules 150A, 150B, and 150C, respectively. The management device 110 may also have an ADF module 150D. The devices 120A-120C may be referred to collectively as the devices 120, or generically as a device 120.

In FIG. 1, the solid line shows a packet flow for download of the network device software image 130 by the network file transfer application 140 to the device 120B. The dashed line shows a packet flow for download of the network device software image 130 by the network file transfer application 140 to the device 120C. The downloads of the network device software image 130 to the devices 120B and 120C may occur simultaneously.

In some example embodiments, the ADF module 150A forwards data packets to the device 120B while the network device software for the device 120A is being received, allowing the downloading of the network device software for both devices 120A and 120B to occur in parallel. Similarly, the ADF module 150A may forward a request for the network device software from the device 120B or 120C to the management device 110, even while the network device software of the device 120A is not yet installed, is in a debug mode, or is not functioning correctly.

The management device 110 uses ANI to provide the role of the registrar. The management device 110 has connections to a MASA and a certificate authority (CA). The ADF modules 150A-150C in the devices 120A-120C perform bootstrap (e.g., connect to the management device 110, download the network device software image 130 to a device 120, and cause the device 120 to begin executing the network device software). The ADF modules 150A-150C also enable connectivity from the management device 110 to all the devices 120A-120C, even though the devices 120A-120C cannot otherwise forward any user traffic because the network device software is not yet installed. The ADF modules 150A-150C also inform the management device 110 of the ADF addresses of the devices 120A-120C so that the management device 110 can send data to the devices 120A-120C.

Figure 2:
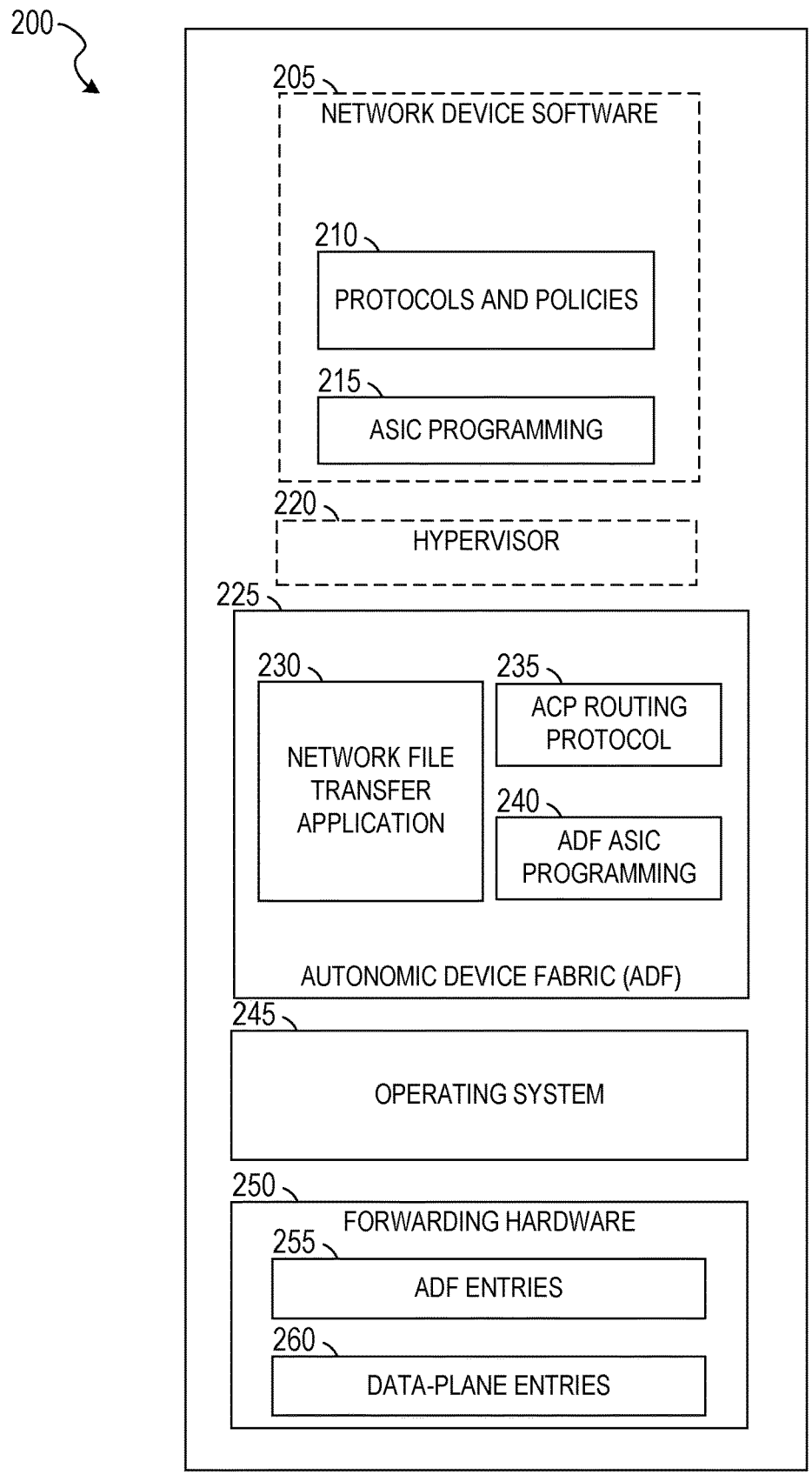
FIG. 2 is an illustration of components of a network device suitable for use in an ADF, according to some example embodiments.

FIG. 2 is an illustration of components of a network device 200 suitable for use in an ADF, according to some example embodiments. The devices 120A-120C of FIG. 1 may utilize the components shown in FIG. 2. The network device 200 includes network device software 205 that performs data plane packet processing. In some example embodiments, the network device software 205 is run in a virtual machine controlled by a hypervisor 220. The network device 200 also includes an ADF 225, an operating system (OS) 245 that runs the ADF 225, and forwarding hardware 250. A virtual machine provides functionality to execute an OS. By being run in separate virtual machines, software is further compartmentalized when compared with software merely running in separate processes under a single OS. The hypervisor 220 controls access to physical hardware, allowing the OS of each virtual machine to share access to the hardware without having access to the operations being performed by the OSes of other virtual machines.

The network device software 205 includes protocols and policies 210 and ASIC programming 215. The protocols and policies 210 comprise the routing protocols supported by the network device software 205, as well as any set of functions that can provide network connectivity to the network device 200 via the network device software 205. These functions provided by the network device software 205 include but are not limited to network address translation (NAT), forwarding policies, and filtering polices. The ASIC programming 215 programs one or more ASICs of the network device 200 to provide hardware acceleration for the network device software 205.

The ADF 225 includes a network file transfer application 230, an ACP routing protocol 235, and ADF ASIC programming 240. Thus, the network device 200 includes two separate instances of networking software: one in the ADF 225 and one in the network device software 205. As long as the ADF 225 is functioning properly, the network device 200 will be able to interact for network and software management functions described here. As long as the network device software 205 is functioning properly, the network device 200 will be able to interact with the network for user traffic. The ACP routing protocol 235 is a protocol for use by the network file transfer application 230. The ADF ASIC programming 240 programs one or more ASICs of the network device 200 to provide hardware acceleration for the ADF 225. The ADF 225 may be implemented by one or more processors of an ASIC, such as a central processing unit (CPU) of a Baseboard Management ASIC.

The forwarding hardware 250 receives packets on input ports and sends packets on output ports. The output ports comprise a plurality of physical ports. For some network implementations, the use of forwarding hardware 250 is required to achieve the expected throughput. For example, a CPU-based implementation may be able to route 1 Gb/s of traffic, but this is insufficient for a 10 Gb/s/port network implementation. The forwarding hardware 250 may access ADF entries 255 for forwarding packets under the control of the ADF 225 and data-plane entries 260 for forwarding packets under the control of the network device software 205. Since the ADF entries 255 are locked, the network device software 205 cannot alter the ADF entries 255, ensuring that the ADF 225 is able to access the correct forwarding entries even if the network device software 205 malfunctions or maliciously attempts to overwrite or delete the ADF entries 255.

When the network device 200 bootstraps (e.g., as a first operation after being powered on or reset), the forwarding hardware 250 is un-programmed and the OS 245 (e.g., Linux) and the ADF 225 are stored in firmware. During the boot process, the OS 245 and the ADF 225 begin execution (e.g., by copying instructions from firmware into random access memory (RAM) and initiating execution of the RAM copy of the instructions). The ADF 225 provides ANI-style functions, such as the ACP routing protocol 235, plus two novel aspects: the network file transfer application 230 and the ADF ASIC programming 240. The ADF 225 programs the forwarding hardware 250 with the ADF entries 255. The ADF entries 255 are used by the ACP routing protocol 235. Each of the forwarding entries identifies an outgoing port on which packets can be sent. For example, a forwarding entry may identify an outgoing port to which packets can be sent that are addressed to a particular set of IP addresses. In some example embodiments, a forwarding entry identifies the outgoing port to which packets should be sent from the network device 200 to reach a particular destination along with the outgoing ports for each other networking device along a path from the network device 200 to the destination. While configuring the ADF entries 255 or after the ADF entries 255 are configured, the ADF 225 locks the ADF entries 255, preventing other processes from modifying the ADF entries 255.

The network file transfer application 230 uses the ACP routing protocol 235 to download the network device software 205 from a management device (e.g., the management device 110). Once the network device software 205 has been downloaded, the network device software 205 can be activated. The network device software 205 may be run in a virtual machine controlled by the hypervisor 220 or be run as monolithic software.

In the absence of ADF, a prior-art management device could at best install software on the device 120A (FIG. 1), but would not be able to also install software on the devices 120B and 120C (FIG. 1), because existing systems cannot securely and automatically route packets through to the next device before the network device software 205 is loaded onto the device. As can be seen in FIG. 2, the ADF 225 is independent of the network device software 205. By contrast, existing ACP implementations are part of the network device software, so in existing devices, ACP would also first need to be loaded onto the device before ACP can forward packets. In prior-art devices, it is not possible to modularly load the main network device software independently of the ACP.

Figure 3:
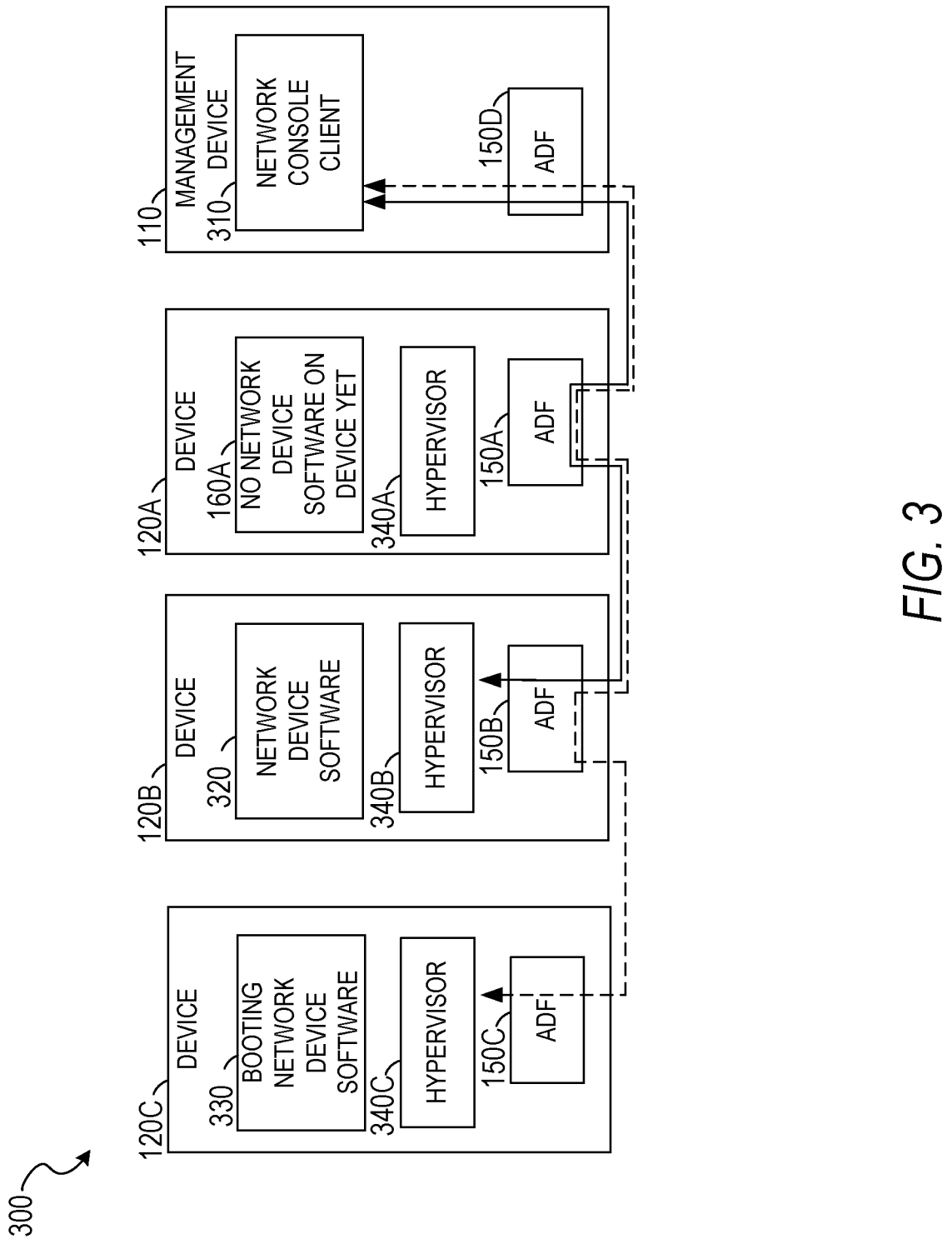
FIG. 3 is an illustration of an example network organization for an ADF, according to some example embodiments.

FIG. 3 is an illustration of an example network organization 300 for an ADF, according to some example embodiments. FIG. 3 includes the management device 110 and the managed devices 120A-120C. Each of the devices 120A-120C has a corresponding storage region 160A, 320, or 330. As shown in FIG. 3, the storage region 160A does not yet store network device software, the storage region 320 stores network device software that is running, and the storage region 330 stores network device software that is booting. The management device 110 provides a network console client 310. The devices 120A-120C include the ADF modules 150A-150C, respectively. The management device 110 may also include the ADF module 150D. Though not shown in FIG. 3, the management device 110 may include the network device software image 130 and the network file transfer application 140, as shown in FIG. 1. Through the use of the ADF module 150A, the device 120A is able to forward packets between the device 120B and the management device 110, even though no network device software has yet been loaded on the device 120A. In each device 120A-120C, a hypervisor 340A, 340B, or 340C, respectively, controls a virtual machine in which network device software can run.

As shown in FIG. 3, only the device 120B is currently running network device software. The device 120A does not yet have network device software installed, and the device 120C is still in the process of booting the network device software. Through the use of the ADF module 150C, the hypervisor 340C of the device 120C is able to communicate with the management device 110 (via the devices 120A and 120B), even though the network device software of the device 120C is still booting.

In FIG. 3, the dashed line indicates packet flow between the management device 110 and the device 120C, and the solid line indicates packet flow between the management device 110 and the device 120B. In prior-art systems, devices lack networking functionality when the network device software is not running By contrast, using ADF, the hypervisor of each device is able to send and receive information over the network even before the network device software is started (or even installed) and after the network device software is shut down. Thus, FIG. 3 depicts a system in which the bootstrap and shutdown of the network device software in all devices can be live-observed/diagnosed remotely without external routing supported. Since all of the devices 120A-120C use ADF, the bootstrap and shutdown processes of all devices can be observed even when they boot or shutdown in parallel. For example, in FIG. 3, the device 120A has not yet received the network device software, the device 120B is running the network device software, and the device 120C has received the network device software but the process of booting is not yet complete. Nonetheless, information about the boot process of the device 120A may be received directly by the management device 110 via ADF, information about the boot process of the device 120B may be received indirectly by the management device 110 after processing by the ADF module 150A, and information about the boot process of the device 120C may be received indirectly by the management device 110 after processing by the network device software of the device 120B and the ADF module 150A.

In some example embodiments, routing by the ADF modules 150A-150C is supported even when the network topology changes. In a path-oriented protocol, data packets include path information that identifies a complete path from the source to the destination. Thus, intermediate routers on the path do not need to independently determine the next hop on the route, but only need to retrieve the next hop from the path stored in the packet. As a result, so long as the source system knows the complete path to the destination, intermediate routers will be able to forward the packets.

In the embodiment of FIG. 3, the same network as in FIG. 1 is shown, at a slightly later time. The device 120C and the device 120B have (e.g., after an initial network device software file download) started the network device software, and an operator of the management device 110 can observe the bootstrap of that software via the network console client 310.

Figure 4:
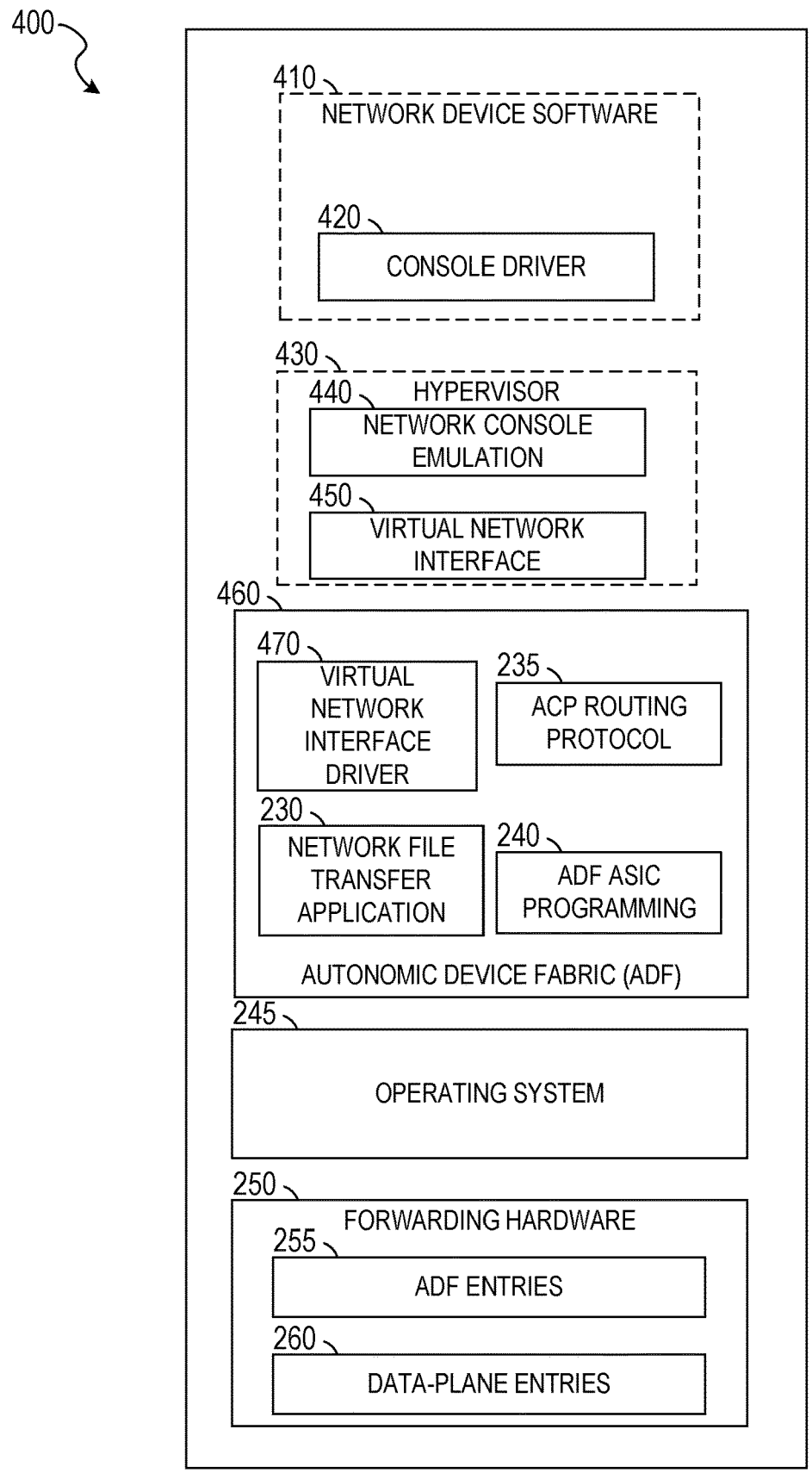
FIG. 4 is an illustration of components of a network device suitable for use in an ADF, according to some example embodiments.

FIG. 4 is an illustration of components of a network device 400 suitable for use in an ADF, according to some example embodiments. The devices 120A-120C of FIG. 3 may utilize the components shown in FIG. 4. The network device 400 includes network device software 410 including a console driver 420. In some example embodiments, the network device software 410 is run in a virtual machine controlled by a hypervisor 430 that provides network console emulation 440 and a virtual network interface 450. The network device 400 also includes an ADF 460, an operating system (OS) 245 that runs the ADF 460, and forwarding hardware 250 (described above with respect to FIG. 2). The network file transfer application 230, ACP routing protocol 235, ADF ASIC programming 240, operating system 245, ADF entries 255, and data-plane entries 260, described above with respect to FIG. 2, are also shown in FIG. 4.

The ADF 460 includes a virtual network interface driver 470 that provides a virtual network interface through which network traffic can be passed even while the actual network device software 410 has not set up its own ("Data-Plane") forwarding entries in the forwarding hardware 250. This virtual network interface passes traffic through the ACP-generated ADF entries 255 in the forwarding hardware 250.

The hypervisor 430 is set up to utilize this virtual network interface. The hypervisor 430 also provides the network console emulation 440 that therefore becomes accessible via the ADF network connection by the network console client 310 of the management device 110 (FIG. 3).

The network device software 410 may be referred to as "virtualized network device software" to indicate that the software is run in a virtual machine. Alternatively or additionally, the network device software 410 may be referred to as "data-plane network device software" to indicate that the software controls networking for user packets (e.g., packet routing and switching for user packets) as compared to network and software installation control packets which are handled by the ADF 460. The network device software 410 utilizes a management console mechanism, provided by the console driver 420, which can be emulated by the network console emulation 440 of the hypervisor 430.

While the network device software 410 is running, the ADF 460 and the network device software 410 coordinate access to the forwarding hardware 250 so that they do not conflict when programming it. In one instance (shown in FIG. 4), the ADF 460 has a reserved initial set of entries in the hardware (the ADF entries 255) that the network device software 410 will not touch. For example, the ADF 460 may be initialized during boot of the network device 400, before the hypervisor 430 is started (and thus, before the hypervisor 430 can start running the virtualized network device software). During initialization of the ADF 460, the ADF 460 may reserve the ADF entries 255 in the forwarding hardware 250. When the network device software 410 later requests to define entries in the forwarding hardware 250, the forwarding hardware 250 may prevent the network device software 410 from modifying the entries defined by other processes, effectively protecting the ADF entries 255. In another example embodiment, the ADF 460 uses a predefined range of entries in the forwarding hardware 250, and the network device software 410 avoids using entries in the predefined range.

In some example embodiments, a mutual exclusion mechanism is used between the ADF 460 and the network device software 410 to ensure that only one changes the forwarding hardware 250 at a time. For example, if the forwarding hardware 250 does not permit parallel write accesses, the mutual exclusion mechanism may be used. In these example embodiments, while the network device software 410 is running, the network device software 410 may have exclusive access to the programming of hardware forwarding entries. In some example embodiments, the ADF 460 is implemented in software run directly (i.e. not in a virtual machine) by the hypervisor 430.

In prior-art implementations without ADF, the hypervisor and virtual machines cannot provide the above-described features in a secure and zero-touch fashion when running on a network device where reachability to remote management stations is only possible via routing protocols. In other words, currently known products with virtualized network device software running on them do not include a modular network device-level stack that combines secure zero touch, automatic addressing, routing, an ability to operate across all interfaces of the device, zero-touch support for hardware-accelerated routing across all interfaces, and coordinated use of forwarding hardware between a management-plane virtual router (the ADF) and another virtual router. In current implementations, providing zero-touch features requires the use of additional hardware to emulate inputs to the network device. To reduce cost, these implementations offer control of only a subset of the available inputs. By contrast, the ADF can control all interfaces of the device, and thus provides superior zero-touch control.

In some example embodiments, the combination of the software management console via a hypervisor and using ADF for the routing and forwarding described herein allows for diagnosis of problems in a network that occur before the network stack is fully functional, which cannot be done when the management console relies on the functioning of the network stack in a network device itself.

Examples of error conditions that can be handled by the systems and methods described herein, but not by prior-art systems, include the following. In prior-art systems, if some hardware is not as expected by the software (driver) and the network stack cannot be brought up as a result, the device will not be able to communicate with the network at all. Using the ADF, the device is able to communicate with the network to forward other traffic and to download updated software. In prior-art systems, if networking to reach the remote management device requires features (e.g., multi-protocol label switching (MPLS)) in the software whose use is controlled by licensing, but the wrong license is installed, the device will not be able to communicate with the management device. Using the ADF, the device is able to communicate with the network to forward other traffic and to download the license. In prior-art systems, if the network stack is misconfigured, the network device software will not be able to communicate with the network. Using the ADF, the device is able to communicate with the network to forward other traffic and to allow for administration via network console emulation provided by the hypervisor, allowing an administrator to remotely correct the configuration of the network stack.

Figure 5:
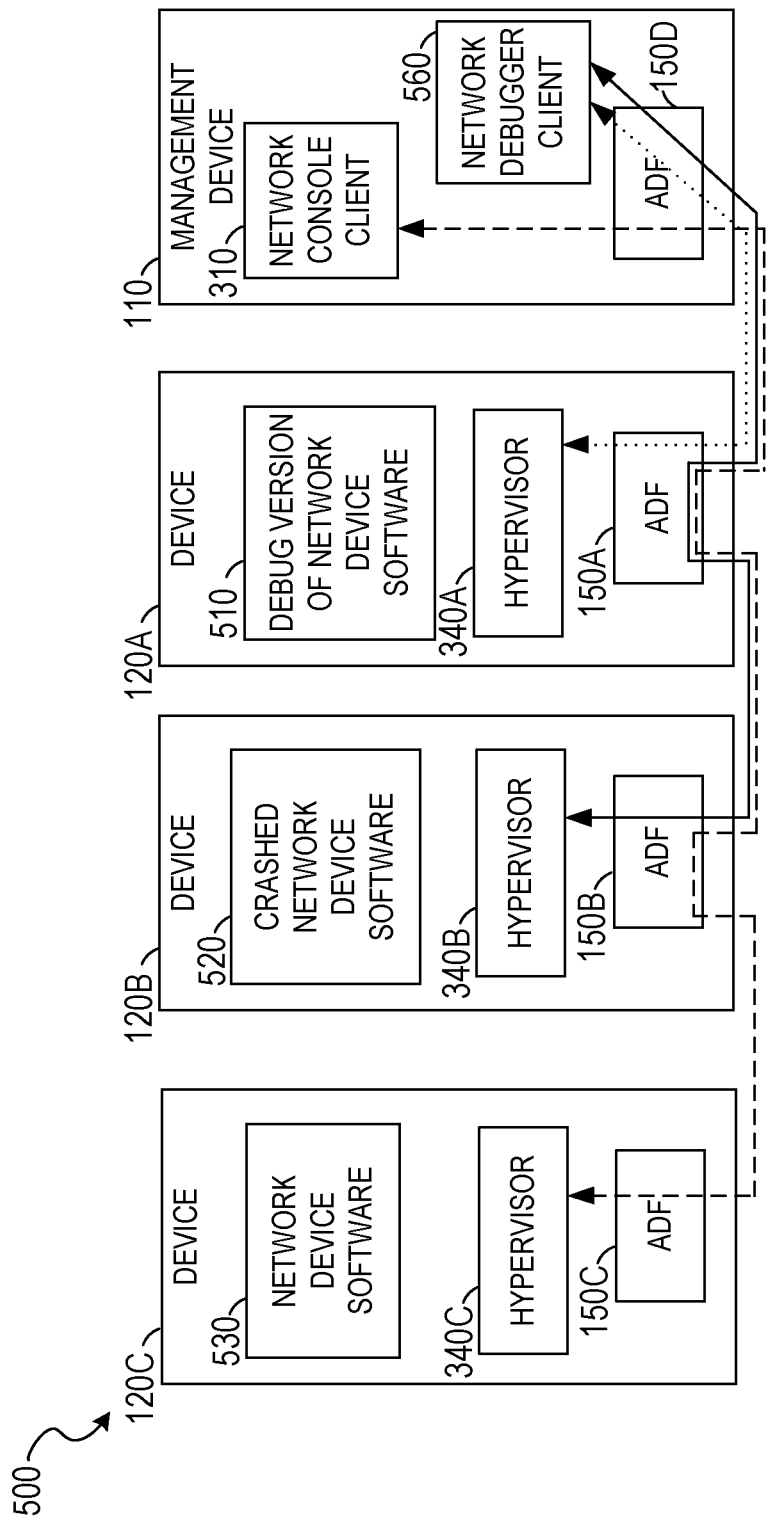
FIG. 5 is an illustration of an example network organization for an ADF, according to some example embodiments.

FIG. 5 is an illustration of an example network organization 500 for an ADF, according to some example embodiments. In FIG. 5, the dashed line indicates packet flow between the management device 110 and the device 120C, the solid line indicates packet flow between the management device 110 and the device 120B, and the dotted line indicates packet flow between the management device 110 and the device 120A. The management device 110 is running a network debugger client 560 that permits remote debugging of network device software of the devices 120A-120C. The device 120A is running a debug version of the network device software 510 under the control of the hypervisor 340A. The device 120B was running a debug version of the network device software under the control of the hypervisor 340B, but the software has crashed, and thus is now crashed network device software 520. The device 120C is running non-debug network device software 530 under the control of the hypervisor 340C. Each of the devices 120A-120C includes a corresponding ADF module 150A-150C, respectively, and the management device 110 includes the ADF module 150D. The network console client 310 and hypervisors 340A-340C, described above with respect to FIG. 3, are also shown in FIG. 5.

The hypervisor 340B may determine that the network device software of the device 120B is not functioning correctly by monitoring the state of a process executing the network device software, by determining that at least a predetermined period of time has elapsed since the last data packet was sent by the forwarding hardware, by failing to receive a response message to a query for status from the network device software, by receiving a message indicating an error from the OS of the virtual machine running the network device software, or any suitable combination thereof. In response to the determination, the hypervisor 340B may enable the ADF module 150B to begin forwarding packets. Additionally or alternatively, the hypervisor 340B may send a message to the management device 110 via the device 120A, the message indicating that an error has occurred in the network device software of the device 120B.

In FIG. 5, the device 120B is a system that permits remote diagnosis of crashed network device software securely, without a need to touch the device 120B and without external device support. The device 120B continues to forward packets correctly despite the crashed network device software 520, even when the network topology/routing changes.

In prior-art systems lacking the ADF firmware, debugging network device software requires relying on other portions of the network device software working properly to enable communication with the device. In other words, to debug the network device software, the functioning of the network device software itself is modified, making it difficult to reproduce and diagnose errors. To work around this, some prior-art systems include a diagnostic stub in the network device software that is accessible via a physical diagnostic port (e.g., a console serial port), but accessing this port requires a physical presence at the device. An expensive further work-around is to add a second physical device, referred to as a "helper device," that connects to the physical diagnostic port, but this requires the installation and maintenance of the second device. The present systems are an improvement over the prior art by allowing the ADF firmware to communicate debug information over the network, thus allowing remote debugging of network device software without modifying the functioning of the network device.

In some example embodiments, the hypervisor 340A provides a virtual diagnostic interface that is reached remotely by the network debugger client 560 via the ADF modules 150A and 150D. Using the virtual diagnostic interface, the management device 110 can perform debugging functions on the running debug version of the network device software 510, such as starting the software, stopping the software, receiving a memory dump from the software, modifying memory values for the software, sending packets using the software, sending packets to the software from the management device 110, or any suitable combination thereof.

In some example embodiments, the debug commands are received by the hypervisor 340A via the ADF module 150A and provided to the debug version of the network device software 510 via the virtual machine in which the network device software 510 is running. Providing the debug commands to the network device software 510 may comprise providing the debug commands to a diagnostic module of the network device software 510.

As described herein, the ADF module 150A is used to control the transmission and receipt of system-level traffic, while the network device software 510 is used to control the transmission and receipt of user traffic. Accordingly, remote debugging of the network device software 510 can be controlled by using the ADF module 150A to receive debug commands and send diagnostic data instead of using the network device software 510 to send and receive network traffic while being debugged. Thus, the operation of the network device software 510 is not impacted by processing debug packets, allowing easier debugging and avoiding an infinite loop. For example, in prior-art network device software, an error in sending a packet may result in an attempt to send a diagnostic packet to a management system. If the attempt to send the diagnostic packet fails, the failed attempt itself may result in an attempt to send another diagnostic packet, which also fails, and so on. To a troubleshooter, the result is a crash of the network device software rather than a clear diagnostic. Use of the ADF module 150A to receive networking debug commands avoids this issue by causing the non-malfunctioning ADF module 150A to send the diagnostic information resulting from a malfunction in the network device software.

Figure 6:
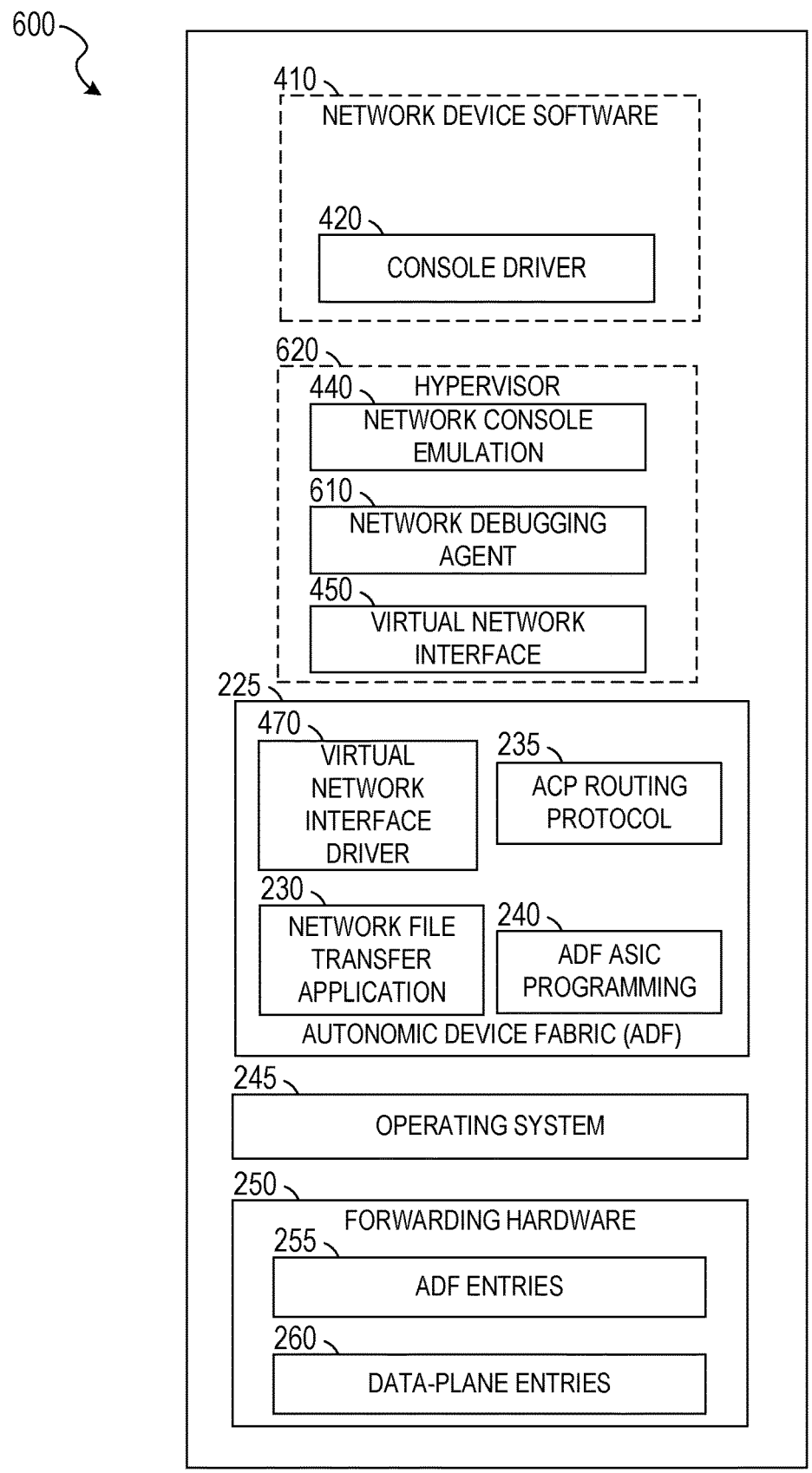
FIG. 6 is an illustration of components of a network device suitable for use in an ADF, according to some example embodiments.

FIG. 6 is an illustration of components of a network device 600 suitable for use in an ADF, according to some example embodiments. The devices 120A-120C of FIG. 5 may utilize the components shown in FIG. 6. FIG. 6 shows the same elements as in FIG. 4, replacing the hypervisor 430 with a hypervisor 620 that includes a network debugging agent 610 (implemented as a network debugging client in the management device).

In some example embodiments, the OS 245 is Linux. In a Linux example, the ADF firmware is implemented as one or more Linux applications, the hypervisor 620 is a kernel virtual machine (KVM), and the network device software 205 is a separate KVM instance, providing isolation of the network device software 205. The network debugging agent 610 is added to the KVM of the hypervisor 620 to allow mapping of the KVM instance's code and data space and allow a debugger (e.g., gdb, the Gnu debugger) to access the code and add breakpoints to the code.

In other example embodiments, the hypervisor 620 is a container management system, (e.g., Linux container-based) and the network device software 205 is a container in the hypervisor 620. The network debugging agent 610 is added to the container management system to easily allow accessing and diagnosing individual processes inside the network device software 205. This solution may be easier to implement, but has the drawback that the network device software 205 will now share the actual firmware OS 245 with the ADF 225, which places limitations on the ability to upgrade the network device software 205.

The following example is provided using the components of FIG. 6 with any of FIG. 1, 3, or 5 as the network topology. For the purpose of the following example, the management device 110 behaves like any other network device. In some example embodiments, the management device 110 does not have hardware forwarding but instead establishes the same forwarding entries via software.

ADF packets sent and received via the forwarding hardware 250 contain a "context-indicator" that identifies them as belonging to the ADF. They also contain an explicit hop-by-hop forwarding field. In one instance this forwarding field is a stack of labels (e.g., an MPLS label stack). During forwarding, the top label is looked up and popped from the stack. When the stack is empty, the packet is passed to ADF firmware because of the context-indicator. In another instance this forwarding field is a sequence of labels and an index into the sequence. Forwarding operates on the index and increments it. After the last index, the packet is passed to ADF firmware because of the context-indicator.

Whenever a packet cannot be delivered to the label indicated in the forwarding field (e.g., due to an interface not working), the packet is also passed to ADF firmware because of the context-indicator for error handling. During system initialization, the ADF firmware fills its set of entries in the forwarding hardware such that every physical interface is assigned one unique label.

If a multi-access link-layer framing such as Ethernet is used between network devices, then ADF packets use an ADF-assigned multicast destination media access control (MAC) address so that they can be seen by any neighboring ADF device at the end of an Ethernet cable without the need to know its assigned unicast MAC address.

After establishing hardware forwarding entries, the ADF uses these entries to establish hop-by-hop routing entries towards all other devices in the network using modified methods defined by ANIMA ACP. All GRASP/ACP packets to a direct neighbor simply use the packet header with an ADF context-indicator and the label for the port to which the neighbor is connected. This includes also the neighbor discovery packets of the neighbor discovery protocol (NDP). Each network device has a unique identifier in the ACP. After neighbor discovery, a device knows the identifier of every directly connected neighbor. Every device informs its neighbors whenever it changes positions in the network topology, providing both its own unique identifier and the identifier for every discovered neighbor. For each device, the set of neighboring devices is referred to as the "network vicinity" of the device. This process of informing neighbors of the network vicinity after changing positions is referred to as "flooding." The flooding reaches every device in the network rather than only the network vicinity of the flooding device.

Flooding uses mechanisms such as those defined by GRASP. For example, every device remembers and forwards the network vicinity packets it receives and performs some method of loop prevention. From the set of all remembered network vicinities, every device can calculate hop-by-hop paths towards every other network device. A path is a list of labels to reach that device (simply the list of ports to be traversed). This list is used in generated ADF packets to the target device and may be encoded as a stack or a sequence depending on the forwarding mechanism used in the network. For example, the "Shortest Path First" algorithm can be used to calculate shortest paths.

In another instance of this example, the context-indicator also has a possible value for the "Data Plane," therefore allowing for the data plane to also use the hardware forwarding entries and labels created by the ADF firmware. This is beneficial when each device is a chassis in multi-chassis network equipment and the links are fabric links, allowing the encapsulation of all packets to be freely chosen.

In the prior art, debugging is not permitted to be even included in production versions of network device software because the debugging code has to be compiled into the network device and therefore impacts performance of the network device software (e.g., by increasing the size of the software, increasing the load time of the software, and increasing the execution time of the software). Using the systems and methods discussed herein, debugging functionality is part of the hypervisor or dynamically loaded by the hypervisor independently of the production version of the network device software and can therefore be transparently enabled or disabled. Furthermore, given that there is no need for an artificial link between the device under test and the debugging software, using the systems and methods described herein, there is no special code required in the actual network device software to support debugging.

In some example embodiments, the ADF firmware is configured to return packets that fail to be delivered by using the reverse of the path included in each packet. Thus, the forwarding hardware 250 can not only handle the normal forwarding of the packets, but also detect errors and return packets to their senders. As previously discussed, the packet header may use a context-indicator that indicates whether the packet is from ADF firmware or network device software. The packet header may also include a path, in the form of a label sequence, and a current position along the path, referred to as a "label-index." An additional field, return-label-index, may also be included with a special value "notset," indicating that the packet is initially travelling on the forward path, not the return path.

Upon receiving a packet, the ADF firmware may examine the return-label-index. If the return-label-index is "notset" and the packet was received from an interface, the label indicated by the label-index is remembered and the label is replaced by the label that this device would use to send packets to the interface from which this packet was received. The label-index is incremented. Thus, the label sequence is changed so that the portion before the current index indicates the route back to the sender while the portion after the current index indicates the route to the destination. If, after incrementing, the label-index is beyond the last label, then the packet has arrived at the destination device and the ADF firmware passes the packet to a context indicated by the context-indicator. Otherwise, the outgoing interface is determined by the label now pointed to by the label-index, and the ADF firmware attempts to deliver the packet to the selected outgoing interface.

If, upon receiving a packet, the ADF firmware determines that the return-label-index stores an index value (i.e. is not "notset"), the return-label-index is checked to determine if the network device is the source device for the packet. If the return-label-index is before the first label, the packet has arrived at its original source device and the ADF firmware passes the packet to the context indicated by the context-indicator. Otherwise, the outgoing interface is selected using the label pointed to by the return-label-index. Before the packet is sent, the return-label-index is decremented. Return label packets that fail to be delivered are discarded.

When a packet cannot be delivered to an outgoing interface (e.g., the interface is down), or to a context (e.g., a hardware queue to the ADF or the network device software is full because the ADF firmware has died), the packet is "turned around." To turn around a packet, the label-index is copied to the return-label-index, the return-label-index is decremented by one, and the packet is passed back to the initial step, for processing as though it were just received.

One issue with sharing forwarding hardware is the need for two entities, the ADF and the network device software, to synchronize changing their entries in it. In some example embodiments, the ADF sets up its entries initially before the network device software runs, and afterwards only the network device software needs to create/modify/delete its own entries, while the ADF never needs to change its entries again—even when its routing table changes. By contrast, prior-art systems do not provide generic mechanisms to share access to common hardware forwarding—or to avoid it. When forwarding hardware is abstracted, for example via OpenFlow, then there is a set of software (e.g., the OpenFlow agent) on a device to coordinate access. This would be equivalent to the network device software relying on a service by the ADF to access the forwarding hardware. In some example embodiments, this dependency is eliminated.

In some example embodiments, devices that implement sender-defined hop-by-hop forwarding are used to create a system in which two independent network forwarding subsystems (the ADF and the network device software) are de-coordinated by sequentializing access to shared forwarding hardware. A combination of explicit context and separate label header fields permits punting of packets to the correct context when forwarding fails on an intermittent node. By contrast, in MPLS, the context would be another label and therefore would be unknown to the intermediate hop.

In some example embodiments, packets perform online tracing of a return hop-by-hop path in the hardware forwarding context. The online tracing feature allows support of symmetric traffic flows without the need for both sides of a connection to coordinate their path-selection algorithm. Accordingly, the responder context simply uses the traced return paths of packets from the initiator. In existing solutions, the traced return path is not used, nor do existing systems use hardware forwarding. In some example embodiments, packets are returned purely by hardware forwarding if the receiving context has failed. In prior-art systems, this type of failure results in blackholes only, wherein packets are never returned.

In some example embodiments, using the exact reverse path increases the likelihood that the path will work. Packets can be returned purely by hardware forwarding, therefore avoiding today's common problems that intermediate nodes have when a link on the path fails and they have to software-indicate issues back to senders. Senders have full diagnostics of the path used by returned packets: they know where along the path the failure happened and whether it was an interface or a context (from the label-index that was left at the state it was in at the hop where the error happened).

Figure 7:
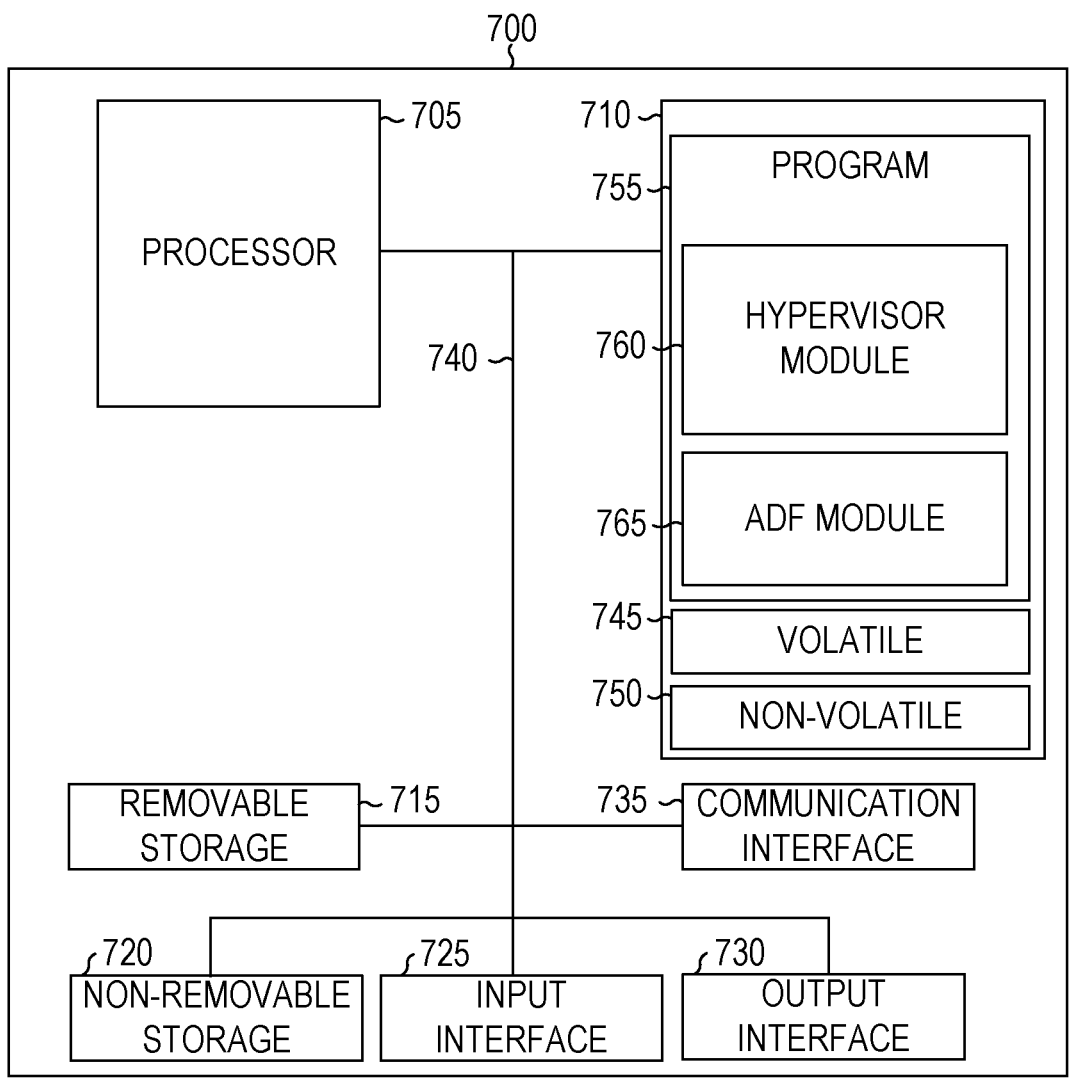
FIG. 7 is a block diagram illustrating circuitry for implementing algorithms and performing methods, according to some example embodiments.

FIG. 7 is a block diagram illustrating circuitry for implementing algorithms and performing methods, according to example embodiments. All components need not be used in various embodiments. For example, clients, servers, autonomous systems, and cloud-based network resources may each use a different set of components, or, in the case of servers for example, larger storage devices.

One example computing device in the form of a computer 700 (also referred to as a computing device 700 and a computer system 700) may include a processor 705, memory storage 710, removable storage 715, and non-removable storage 720, all connected by a bus 740. Although the example computing device is illustrated and described as the computer 700, the computing device may be in different forms in different embodiments. For example, the computing device may instead be a smartphone, a tablet, a smartwatch, or another computing device including elements the same as or similar to those illustrated and described with regard to FIG. 7. Devices such as smartphones, tablets, and smartwatches are generally collectively referred to as "mobile devices" or "user equipment." Further, although the various data storage elements are illustrated as part of the computer 700, the storage may also or alternatively include cloud-based storage accessible via a network, such as the Internet, or server-based storage.

The memory storage 710 may include volatile memory 745 and non-volatile memory 750, and may store a program 755. The computer 700 may include, or have access to a computing environment that includes, a variety of computer-readable media, such as the volatile memory 745, the non-volatile memory 750, the removable storage 715, and the non-removable storage 720. Computer storage includes random-access memory (RAM), read-only memory (ROM), erasable programmable read-only memory (EPROM) and electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

The computer 700 may include or have access to a computing environment that includes an input interface 725, an output interface 730, and a communication interface 735. The output interface 730 may interface to or include a display device, such as a touchscreen, that also may serve as an input device. The input interface 725 may interface to or include one or more of a touchscreen, a touchpad, a mouse, a keyboard, a camera, one or more device-specific buttons, one or more sensors integrated within or coupled via wired or wireless data connections to the computer 700, and other input devices. The computer 700 may operate in a networked environment using the communication interface 735 to connect to one or more remote computers, such as database servers. The remote computer may include a personal computer (PC), server, router, network PC, peer device or other common network node, or the like. The communication interface 735 may connect to a local-area network (LAN), a wide-area network (WAN), a cellular network, a WiFi network, a Bluetooth network, or other networks.

Computer instructions stored on a computer-readable medium (e.g., the program 755 stored in the memory storage 710) are executable by the processor 705 of the computer 700. A hard drive, CD-ROM, and RAM are some examples of articles including a non-transitory computer-readable medium such as a storage device. The terms "computer-readable medium" and "storage device" do not include carrier waves to the extent that carrier waves are deemed too transitory. "Computer-readable non-transitory media" includes all types of computer-readable media, including magnetic storage media, optical storage media, flash media, and solid-state storage media. It should be understood that software can be installed in and sold with a computer. Alternatively, the software can be obtained and loaded into the computer, including obtaining the software through a physical medium or distribution system, including, for example, from a server owned by the software creator or from a server not owned but used by the software creator. The software can be stored on a server for distribution over the Internet, for example.

The program 755 is shown as including a hypervisor module 760 and an ADF module 765. Any one or more of the modules described herein may be implemented using hardware (e.g., a processor of a machine, an ASIC, an FPGA, or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The hypervisor module 760 provides a hypervisor that runs one or more virtual machines. Each virtual machine runs a separate operating system. The hypervisor manages the execution of the virtual machines and their operating systems. The virtual machines may run different operating systems. In some example embodiments, the hypervisor instead provides OS-level virtualization, wherein each virtual machine is a container and the containers share a single kernel.

The ADF module 765 provides ADF functionality to the computer 700. Though the ADF module 765 is shown in FIG. 7 as being implemented in software, as part of the program 755, the ADF module 765 may be implemented in firmware, stored in the non-volatile memory 750 or as a hardware component (e.g., an ASIC or programmed FPGA). The hypervisor has access to the ADF module 765, and thus is able to provide networking functionality independent of the operation of any network device software running in a virtual machine.

Figure 8:
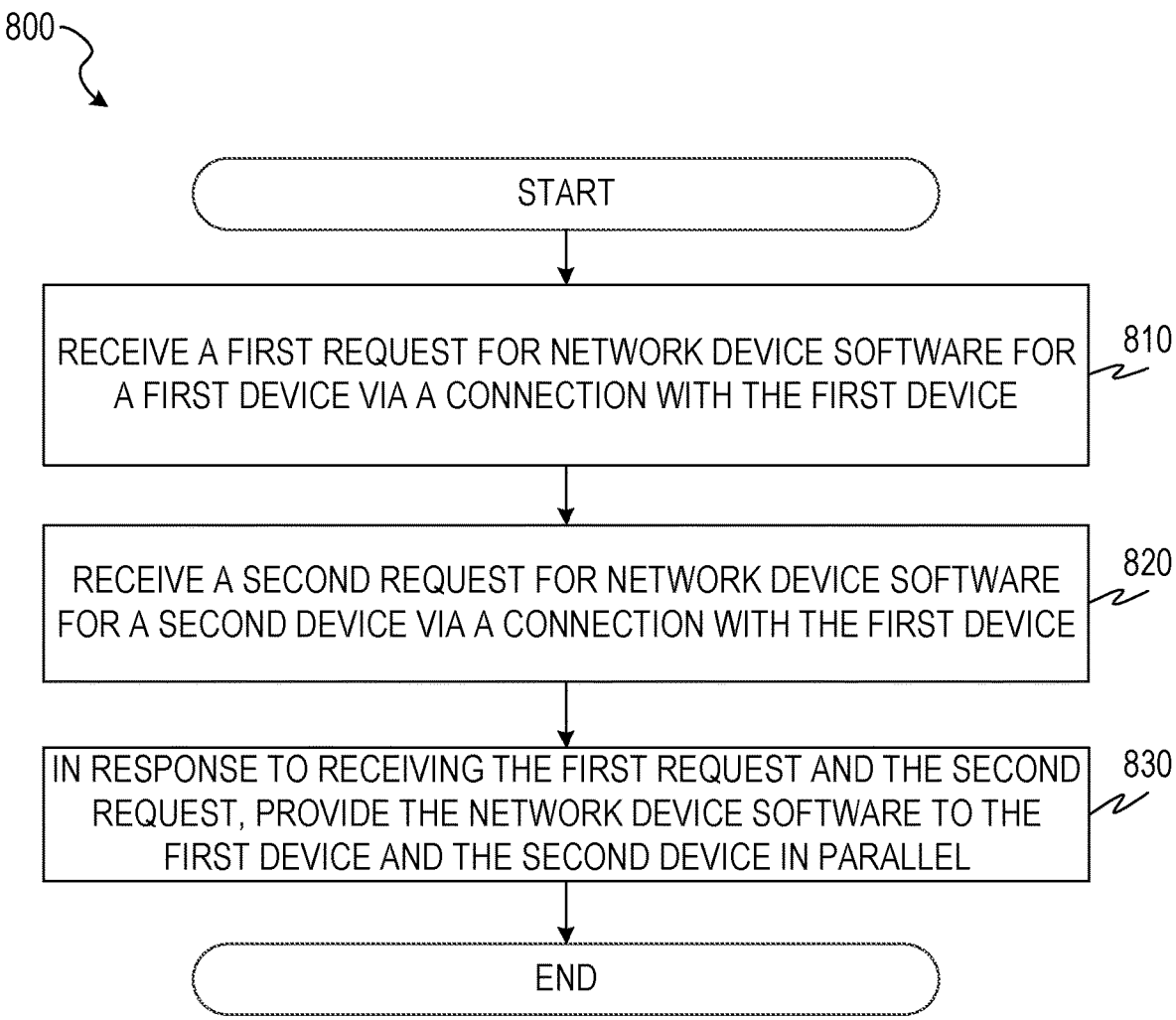
FIG. 8 is a flowchart illustrating operations of a network management device performing a method suitable for use in an ADF, according to some example embodiments.

FIG. 8 is a flowchart illustrating operations of a network management device performing a method 800, suitable for use in an ADF, according to some example embodiments. By way of example and not limitation, the method 800 is described below as being performed by the management device 110 implemented by the computing device 700. The method 800 includes operations 810, 820, and 830.

In operation 810, the ADF module 765 of a network management device receives a first request for network device software for a first device via a connection with the first device. For example, the ADF module 150A of the device 120A may send a request for network device software to the management device 110. As shown in FIG. 1, the device 120A is connected to the management device 110. In this example, the request is received by the ADF module 150D of the management device 110.

In operation 820, the ADF module 765 receives a second request for network device software for a second device via the connection with the first device. For example, the ADF module 150B of the device 120B may send a request for network device software for the device 120B to the ADF module 150A of the device 120A. The ADF module 150A forwards the request for the device 120B, and the request for the device 120B is received by the ADF module 150D from the ADF module 150A. The ADF module 150D provides the received requests to the network file transfer application 140 for processing.

In operation 830, in response to the receiving of the first request and the second request by the network management device, the network file transfer application 140 of the network management device provides the network device software to the first device and the second device in parallel. For example, the network file transfer application 140 may provide, via the ADF module 150A, one or more files to the ADF module 150B along with an indication that the files are intended for receipt by both the device 120A and the device 120B. In some example embodiments, the indication comprises a set of device identifiers (e.g., MAC addresses, IP addresses, device serial numbers, and the like), each member of the set uniquely identifying one of the devices 120A-120C. In other example embodiments, the indication comprises a plurality of lists of labels, including a first list of labels identifying a path through the network to the destination device 120A and a second list of labels identifying a path through the network to the destination device 120B. Because the network device software is being provided to both machines simultaneously, the provisioning is referred to as being done in parallel. By contrast, in prior-art solutions using the network device software to forward packets, the network device software for the device 120A would be installed first, and then the installed network device software would be used to forward packets to the device 120B. Thus, in prior-art solutions, the provisioning of network device software would be done serially.

Figure 9:
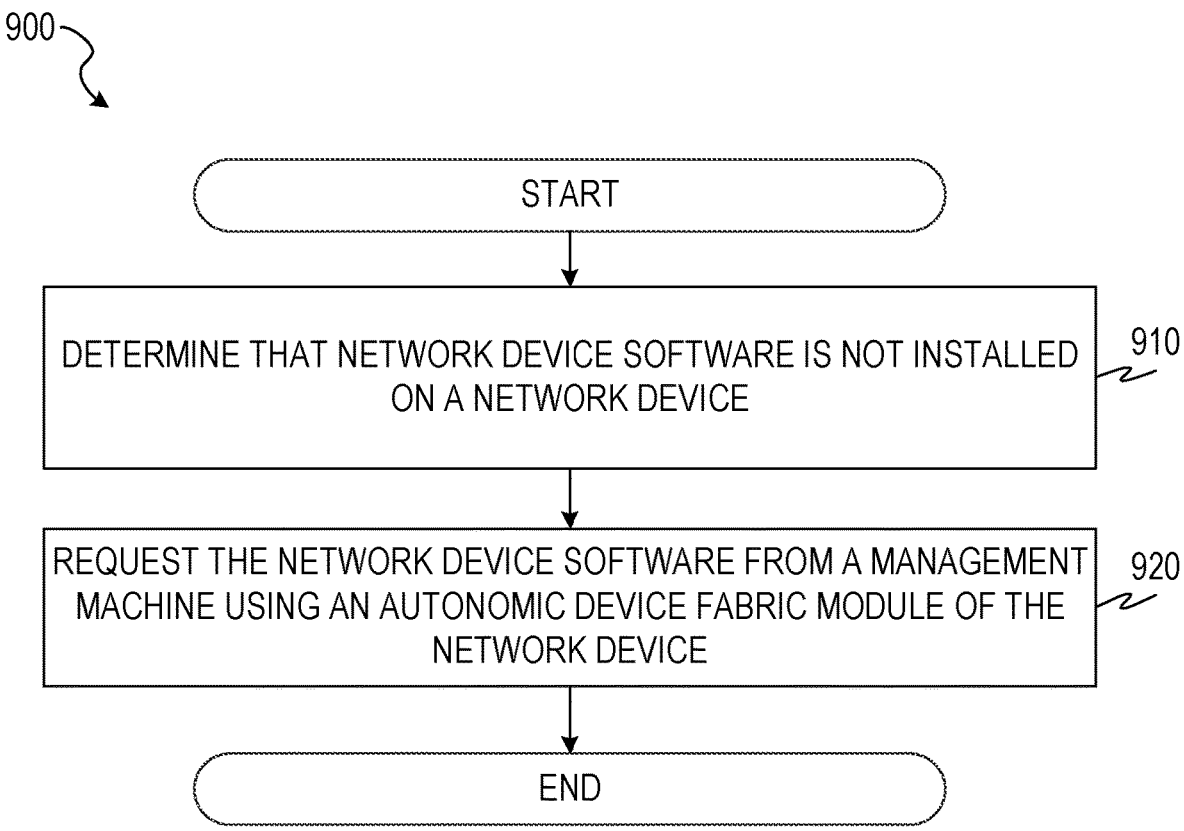
FIG. 9 is a flowchart illustrating operations of a network device performing a method suitable for use in an ADF, according to some example embodiments.

FIG. 9 is a flowchart illustrating operations of a network device performing a method 900 suitable for use in an ADF, according to some example embodiments. By way of example and not limitation, the method 900 is described below as being performed by the device 120A implemented by the computing device 700 in the network organization 300. The method 900 includes operations 910 and 920.

In operation 910, the hypervisor 340A of the device 120A determines that network device software is not installed on the device 120A. For example, network device software may register networking capabilities with the hypervisor 340A when the network device software is installed. Accordingly, if no networking capabilities are registered with the hypervisor 340A, the hypervisor 340A may determine that the network device software is not installed.

In operation 920, the hypervisor 340A of the device 120A requests the network device software from the management device 110 using the ADF module 150A of the device 120A. For example, a request may be sent to the network file transfer application 140 (shown in FIG. 1). The ADF module 150A receives the network device software, which is installed and run by the hypervisor 340A to enable dataplane networking.

According to one aspect of the present disclosure, a management device configured to download network device software simultaneously into multiple network devices without network device software is provided, wherein at least one of the multiple network devices is connected to the management device via at least one other one of the multiple network devices.

According to one aspect of the present disclosure, a management device enabled to remotely observe the bootstrap and shutdown of network device software in a plurality of network devices is provided, wherein routing from the management device to each network device of the network devices is provided within the plurality of networking devices.

Optionally, in any of the preceding aspects, devices of the plurality of network devices boot or shut down in parallel.

Optionally, in any of the preceding aspects, the remote observing of the bootstrap and shutdown of network device software occurs while the network topology is changing.

According to one aspect of the present disclosure, a management device enabled to remotely diagnose crashed network device software securely, without external device support, is provided.

According to one aspect of the present disclosure, a system comprising a plurality of network devices, in which devices of the plurality of network devices having crashed network device software continue to forward packets correctly, is provided.

Optionally, in any of the preceding aspects, the devices of the plurality of network devices having crashed network device software continue to forward packets correctly while the network topology is changing.

According to one aspect of the present disclosure, a networked device in which remote debugging of routing and forwarding does not impact the debugging result is provided.

According to one aspect of the present disclosure, a management device comprising a management-plane routing system that provides dynamic routing using non-changing hardware forwarding entries is provided.

Optionally, in any of the preceding aspects, the management device allows network device software to have exclusive access to programming of the hardware forwarding entries while the network device software is running.

According to one aspect of the present disclosure, a networked device comprising hardware configured to return packets that fail to be delivered using a reverse path of the packets is provided.

According to one aspect of the present disclosure, a management device is provided that comprises: a memory that stores instructions; and one or more processors configured by the instructions to perform operations comprising: receiving a first request for network device software for a first device via a connection with the first device; receiving a second request for the network device software for a second device via the connection with the first device; and in response to the receiving of the first request and the second request, providing the network device software to the first device and the second device in parallel.

Optionally, in any of the preceding aspects, the operations further comprise receiving a shutdown message for the second device via the connection with the first device.

Optionally, in any of the preceding aspects, the receiving of the first request and the receiving of the second request occur while a topology of a network comprising the management device, the first device, and the second device is changing.

Optionally, in any of the preceding aspects, the operations further comprise receiving an error message via the connection with the first device, the error message originating from the second device and reporting an error condition in network device software of the second device.

Optionally, in any of the preceding aspects, the management device further comprises a management-plane routing system that provides dynamic routing using static hardware forwarding entries.

Optionally, in any of the preceding aspects, the operations further comprise allowing the network device software to have exclusive access to programming of the hardware forwarding entries while the network device software is running.

Although a few embodiments have been described in detail above, other modifications are possible. For example, the logic flows depicted in the figures do not require the particular order shown, or sequential order, to achieve desirable results. Other steps may be provided in, or steps may be eliminated from, the described flows, and other components may be added to, or components may be removed from, the described systems. Other embodiments may be within the scope of the following claims.

What is claimed is:

1. A network device comprising:
a plurality of physical ports;
autonomic device fabric (ADF) firmware configured to receive, send, and forward data packets via the plurality of physical ports;
a memory that stores instructions; and
one or more processors configured by the instructions to perform operations comprising:
determining that network device software is not installed; and
requesting the network device software from a management machine using the ADF firmware, the requesting comprising sending a request from the ADF firmware of the network device to ADF firmware of a second network device for forwarding to the management machine.

2. The network device of claim 1, wherein:
the operations are performed by a hypervisor; and
the operations further comprise:
receiving the network device software via the ADF firmware, from the ADF firmware of the second network device, the network device software originating from the management machine; and
running the network device software in a virtual machine.

3. The network device of claim 2, wherein:
the ADF firmware configures and locks first entries in a hardware forwarding table comprising hardware forwarding entries; and subsequently, the network device software configures second entries in the hardware forwarding table.

4. The network device of claim 3, wherein:
while the network device software is running, the network device software has exclusive access to programming of the hardware forwarding entries.

5. The network device of claim 2, wherein the operations further comprise:
receiving a debug command for the network device software via the ADF firmware; and
providing the debug command to the network device software.

6. The network device of claim 2, wherein the ADF firmware performs operations comprising:
while receiving the network device software originating from the management machine, forwarding data packets from the management machine to a third network device.

7. The network device of claim 1, further comprising:
second one or more processors distinct from the one or more processors;
wherein the ADF firmware is implemented by the second one or more processors.

8. The network device of claim 1, wherein the ADF firmware is implemented in software run directly by a hypervisor.

9. The network device of claim 1, wherein the ADF firmware forwards a first data packet from the second network device by performing operations comprising:
accessing a path from the first data packet;
accessing an index from the first data packet;
determining, based on the path and the index, an outgoing port for the first data packet;
modifying the first data packet by incrementing the index; and
sending the modified first data packet on the outgoing port.

10. The network device of claim 9, wherein the first data packet comprises an error packet that indicates an error in networking device software of the second network device.

11. The network device of claim 1, wherein the ADF firmware performs operations comprising:
receiving a first data packet from the second network device;
accessing a path from the first data packet;
accessing an index from the first data packet that identifies an indexed port in the path;
storing the indexed port as an outgoing port;
modifying the first data packet by replacing the indexed port in the path with a port usable by the network device to reach the second network device; and
sending the modified first data packet on the outgoing port.

12. The network device of claim 1, wherein the ADF firmware performs operations comprising:
receiving a first data packet from the second network device, the first data packet being from a source device and for a destination device;
determining, based on the first data packet, that the first data packet is being returned to the source device;
accessing a path from the first data packet;
accessing a return index from the first data packet that identifies an indexed port in the path;
modifying the first data packet by decrementing the return index; and
sending the modified first data packet on the indexed port.

13. A method comprising:
    determining, by one or more processors, that network device software is not installed on a network device; and
    requesting the network device software from a management machine using autonomic device fabric (ADF) firmware of the network device, the requesting comprising sending a request from the ADF firmware of the network device to ADF firmware of a second network device for forwarding to the management machine.

14. The method of claim 13, further comprising:
    receiving the network device software via the ADF firmware, from the ADF firmware of the second network device, the network device software originating from the management machine; and
    running the network device software in a virtual machine.

15. The method of claim 14, wherein:
    the ADF firmware configures and locks first entries in a hardware forwarding table comprising hardware forwarding entries; and
    subsequently, the network device software configures second entries in the hardware forwarding table.

16. The method of claim 15, wherein:
    while the network device software is running, the network device software has exclusive access to programming of the hardware forwarding entries.

17. A non-transitory machine-readable medium that stores instructions that, when executed by one or more processors of a machine, cause the machine to perform operations comprising:
    determining that network device software is not installed on a network device; and
    requesting the network device software from a management machine using autonomic device fabric (ADF) firmware of the network device, the requesting comprising sending a request from the ADF firmware of the network device to ADF firmware of a second network device for forwarding to the management machine.

18. The machine-readable medium of claim 17, wherein the operations further comprise:
    receiving the network device software via the ADF firmware, from the ADF firmware of the second network device, the network device software originating from the management machine; and
    running the network device software in a virtual machine.

19. The machine-readable medium of claim 18, wherein:
    the ADF firmware configures and locks first entries in a hardware forwarding table comprising hardware forwarding entries; and
    subsequently, the network device software configures second entries in the hardware forwarding table.

20. The machine-readable medium of claim 18, wherein the operations further comprise:
    while receiving the network device software originating from the management machine, forwarding data packets from the management machine to a third network device.

* * * * *